United States Patent
Weber et al.

(10) Patent No.: US 10,449,725 B2
(45) Date of Patent: Oct. 22, 2019

(54) SYSTEMS AND METHODS TO PREVENT CRACKING OF EXTERIOR PAINT ALONG STRUCTURAL JOINTS OF PAINTED AEROSPACE COMPONENTS

(71) Applicant: EMBRAER S.A., São José dos Campos-SP (BR)

(72) Inventors: Fábio Angheben Weber, São José dos Campos-SP (BR); Cleber Vasquez De Mesquita, São José dos Campos-SP (BR); Felipe Henrique Gouvea, São José dos Campos-SP (BR); Paulo Alexandre De Barros Mendes, São José dos Campos-SP (BR)

(73) Assignee: EMBRAER S.A., São José Dos Campos—SP (BR)

( * ) Notice: Subject to any disclaimer, the term of this patent is extended or adjusted under 35 U.S.C. 154(b) by 289 days.

(21) Appl. No.: 15/378,520

(22) Filed: Dec. 14, 2016

(65) Prior Publication Data

US 2018/0162513 A1    Jun. 14, 2018

(51) Int. Cl.
| | |
|---|---|
| *B29C 65/48* | (2006.01) |
| *F16J 15/02* | (2006.01) |
| *B64F 5/00* | (2017.01) |
| *B64C 1/06* | (2006.01) |

(52) U.S. Cl.
CPC ............... *B29C 65/48* (2013.01); *B64F 5/00* (2013.01); *F16J 15/02* (2013.01); *B64C 1/069* (2013.01); *Y10T 428/197* (2015.01)

(58) Field of Classification Search
CPC ..... Y10T 428/197; B64C 1/069; B29C 65/48; B29C 65/56
See application file for complete search history.

(56) References Cited

U.S. PATENT DOCUMENTS

| | | | | |
|---|---|---|---|---|
| 5,687,523 A | * | 11/1997 | Stough | B32B 29/02 52/417 |
| 2013/0037655 A1 | * | 2/2013 | Bradley | B64C 3/26 244/124 |
| 2014/0011414 A1 | | 1/2014 | Kruckenberg et al. | |
| 2014/0151507 A1 | * | 6/2014 | Woodard | B64C 3/26 244/133 |

* cited by examiner

*Primary Examiner* — Alexander S Thomas
(74) *Attorney, Agent, or Firm* — Nixon & Vanderhye P.C.

(57) ABSTRACT

Anti-paint cracking systems are provided as part of a painted aerospace component (e.g., a fuselage, an engine nacelle, a wing, an empennage, a fairing and the like) having a pair of adjacent structural panels defining therebetween a joint space having a lengthwise extent and a finished paint topcoat covering an exterior surface of the adjacent structural panels and the joint space therebetween. The anti-paint cracking system will thus be associated with the joint space along the lengthwise extent thereof and positioned below the finished paint topcoat. The anti-paint cracking system will include a joint sealant positioned in the joint space and an adhesive tape or a fibrous tape formed of a fiber composite material applied over the joint space and the joint sealant positioned therein.

6 Claims, 2 Drawing Sheets

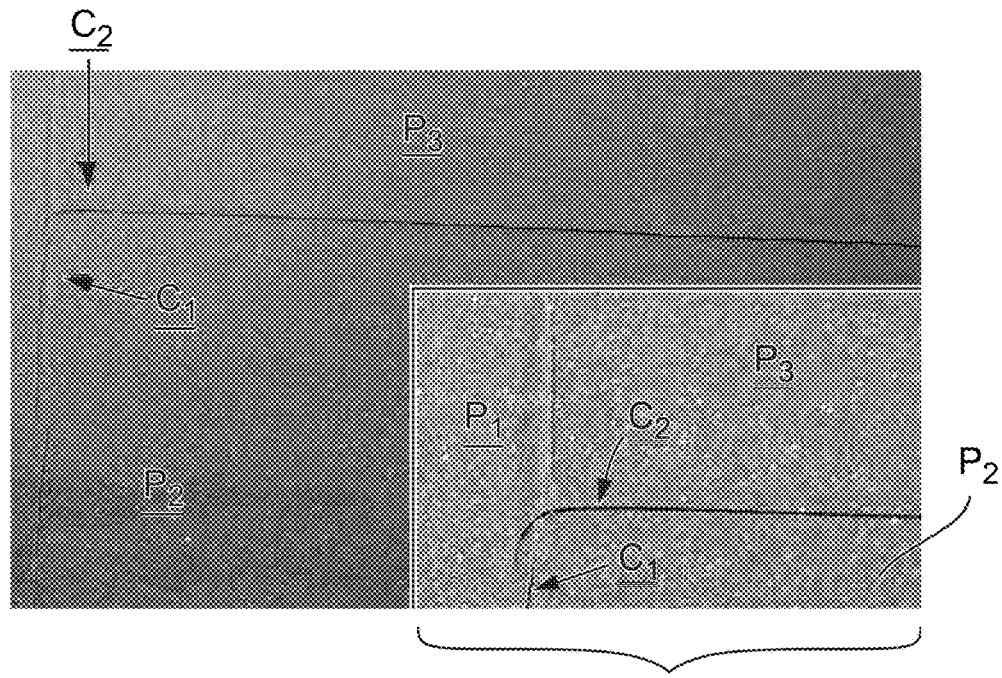
FIG. 1A
(PRIOR ART)
FIG. 1B
(PRIOR ART)
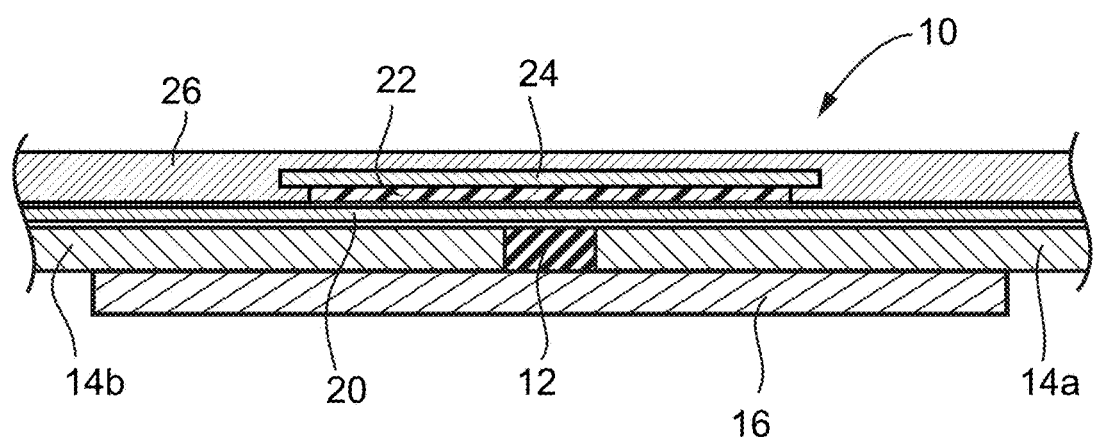
FIG. 2

SYSTEMS AND METHODS TO PREVENT CRACKING OF EXTERIOR PAINT ALONG STRUCTURAL JOINTS OF PAINTED AEROSPACE COMPONENTS

FIELD

The embodiments described herein relate generally to aerospace components having a finished exterior paint layer covering the structural joints thereof (e.g., joints between adjacent aircraft fuselage skin panels), and especially relate to systems and methods which prevent cracking of such finished paint layer at the structural joints of the aerospace component.

BACKGROUND

Cracks in the finished paint on sealed structural joints associated with aerospace components (e.g., joints between adjacent panels associated with a fuselage, engine nacelles, wing skin panels, empennage panels, fairings and the like) has been an issue in the industry which adversely impacts the visual aspects of the finished paint scheme. The issue is particularly acute for the fuselage paint on executive jets where a high quality and visually pleasing paint finish is an important customer requirement. However, cracks in the finished paint along structural joints of the fuselage associated with commercial aviation aircraft is also a very common problem.

Cracks in the finished fuselage paint occur due to the difference of mechanical properties of the materials used at the structural joints (e.g., differences in mechanical properties of the sealant, the metal panel (typically aluminum), and finish paint). These mechanical property differences in turn create localized strain on the finished paint layer when the structure experiences a load, e.g., due to forces caused by internal fuselage pressurization forces and external aerodynamic forces. The consequence of such forces is that the paint visibly cracks along the lengthwise extent of the joint.

It has previously been proposed in this art to create a gap in the sealant between the structural panels before applying the final paint coating. However, this proposed solution has limitations due to the visual aspect of the gap and lack of aerodynamic smoothness. As such, this prior proposal has essentially been limited for use mainly on fairings joining the wings to the fuselage and maintenance access doors.

What has been needed in the art, therefore is a system by which the finished paint covering structural joints of an aerospace component (e.g., an aircraft fuselage) could be protected against cracking. It is towards fulfilling such a need that the embodiments disclosed herein are directed.

SUMMARY

In general, the anti-paint cracking systems will be provided as part of a painted aerospace component (e.g., a fuselage, an engine nacelle, a wing, an empennage, a fairing and the like) having a pair of adjacent structural panels defining therebetween a joint space having a lengthwise extent and a finished paint topcoat covering an exterior surface of the adjacent structural panels and the joint space therebetween. The anti-paint cracking system will thus be associated with the joint space along the lengthwise extent thereof and positioned below the finished paint topcoat. The anti-paint cracking system will include a joint sealant positioned in the joint space and a polymeric adhesive tape or fibrous tape formed of a fiber composite material applied over the joint space and the joint sealant positioned therein.

According to some embodiments, the fiber composite material will comprise synthetic fibers embedded in a polymeric adhesive matrix. The synthetic fibers may be selected from the glass fibers, carbon fibers, boron fibers, and/or aramid fibers. The fiber composite material according to certain specific embodiments will include glass fibers embedded in a curable polymeric resin matrix.

A primer undercoat layer may be applied to the adjacent panels under the fibrous tape so as to cover the joint sealant. Similarly, a secondary primer overcoat may be applied onto at least the fibrous tape below the finished paint topcoat.

A splice plate may be rigidly connected to interior surface regions of the adjacent panels via suitable fasteners (e.g., rivets) along the lengthwise extent of the joint space therebetween.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 1A and 1B respectively depict in lesser and greater magnification a section of a conventional painted aircraft fuselage showing cracks formed between structural panels thereof;

FIG. 2 is an exemplary schematic cross-sectional view of an anti-crack system in accordance with an embodiment of the invention;

DETAILED DESCRIPTION

Accompanying FIGS. 1A and 1B depict the problems discussed previously with respect to cracks forming at the joints between structural panels of an aerospace component (e.g., an aircraft fuselage). Specifically, as depicted in FIGS. 1A and 1B, cracks C1 and C2 in the finished paint coating aligned along the joints between the structural panels P1, P2 and P3 are visibly perceptible. These visibly perceptible cracks C1 and C2 along with other similar cracks (not shown) in the finished paint coating will undesirably detract from the appearance of the aircraft.

Figure 3:
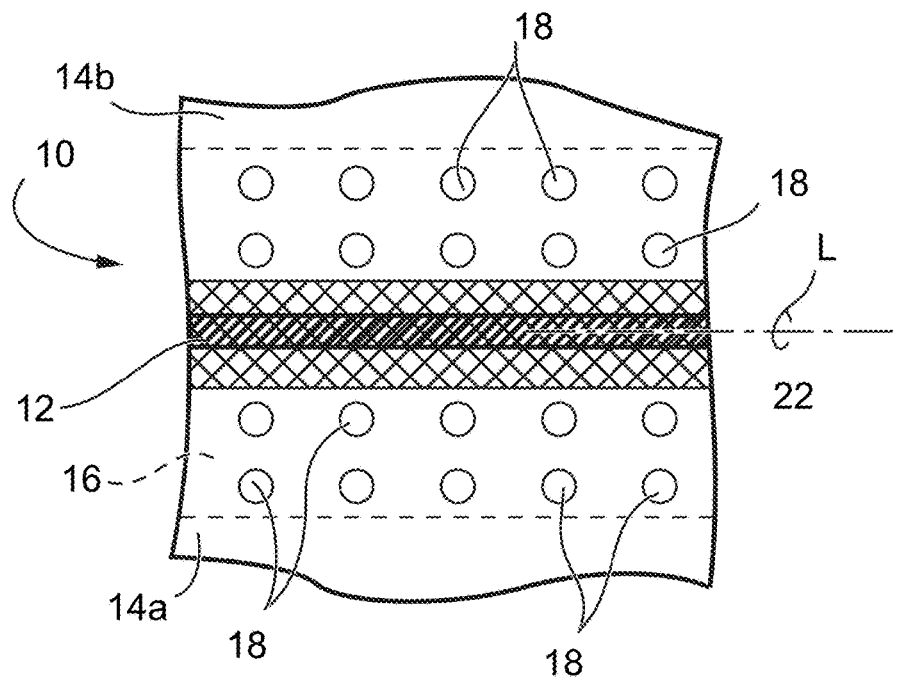
FIG. 3 is a plan view of the anti-crack system shown schematically in FIG. 2 prior to application of the primer overcoat and the finished topcoat.

An anti-crack system 10 in accordance with an embodiment disclosed herein is schematically shown in FIG. 2. In this regard, the anti-crack system 10 is depicted as being applied over the joint sealant 12 which fills the joint space between the opposed ends of structural panels 14a, 14b, respectively. A splice plate 16 is rigidly joined to the interior (back) side of the panels 14a, 14b along the lengthwise direction (arrow L in FIG. 3) of the joint space therebetween by a series of fasteners 18 (not shown in FIG. 2 but a representative few of which are depicted in FIG. 3). Once the joint sealant 12 has been provided within the joint space between the panels 14*a*, 14*b*, a primer coating layer 20 may be applied over substantially the entire or at least some portion of the outside (visible) surfaces laterally of the joint space of the panels 14*a*, 14*b* and to cover the joint sealant 12.

Important to the embodiments disclosed herein, a strip of a fibrous tape 22 is applied over and along the lengthwise direction L of the joint space between the panels 14*a*, 14*b* so as to cover the initial primer undercoat layer 20. The fibrous mat 22 may be formed of virtually any synthetic fiber material. In preferred embodiments, the fibrous tape 22 is in the form of a sheet of a fiber composite material.

As used herein and in the accompanying claims, the term "fiber composite materials" are materials that include reinforcing synthetic fibers embedded in a polymeric adhesive matrix. Fiber-reinforced composite materials are usually supplied as fibrous sheets pre-impregnated with a curable or partially cured resin. The so-called "prepreg sheets" may then be applied onto a structural component and cured to form rigid sheets. Fibers are embedded in a polymeric adhesive matrix (e.g., a curable epoxy resin) that connects the fibers to adjacent metal layers. Fibers may be made of, but are not limited to, glass, carbon, boron, aramid and the like. The adhesive matrix of the prepreg fiber layers may be made of, but are not limited to, epoxy or other adhesive polymers. Preferred for use in the embodiments disclosed herein are fiber composite materials formed of glass fibers embedded in a polymeric matrix. Especially useful are woven glass fiber tapes having a thickness of about 0.1 mm impregnated or embedded within a curable primer epoxy matrix. The individual fibers within the fibrous tape 22 may be oriented at a bias, e.g., an angle of about 45° (+/−5-10°), relative to the lengthwise direction L of the joint space between the panels 14*a*, 14*b*.

The fibrous tape 22 is placed into contact on the initial primer undercoat 20 and is of sufficient width transverse to the lengthwise direction L of the joint space between the panels 14*a*, 14*b* so as to overlap opposing exterior edge regions of each such panels 14*a*, 14*b*. Although a single layer of fibrous tape 22 is schematically depicted in the Figures, it is understood that multiple layers of fibrous tape 22 may be applied one on top of the other as may be required. Once the fibrous tape 22 has cured in position along the lengthwise direction L of the joint space between the panels 14*a*, 14*b*, a secondary primer overcoat 24 may be applied so as to cover the widthwise dimension of the tape 22. The primer overcoat 24 may thus extend beyond the lateral edges of the tape 22 so as to contact the primer undercoat 20.

Once the primer overcoat 24 has cured, the entire surface may be prepared for the application of the finished topcoat paint layer 26, e.g., by abrading the primer undercoats 20 and 24 to enhance the durability of topcoat layer 26.

Figure 4:
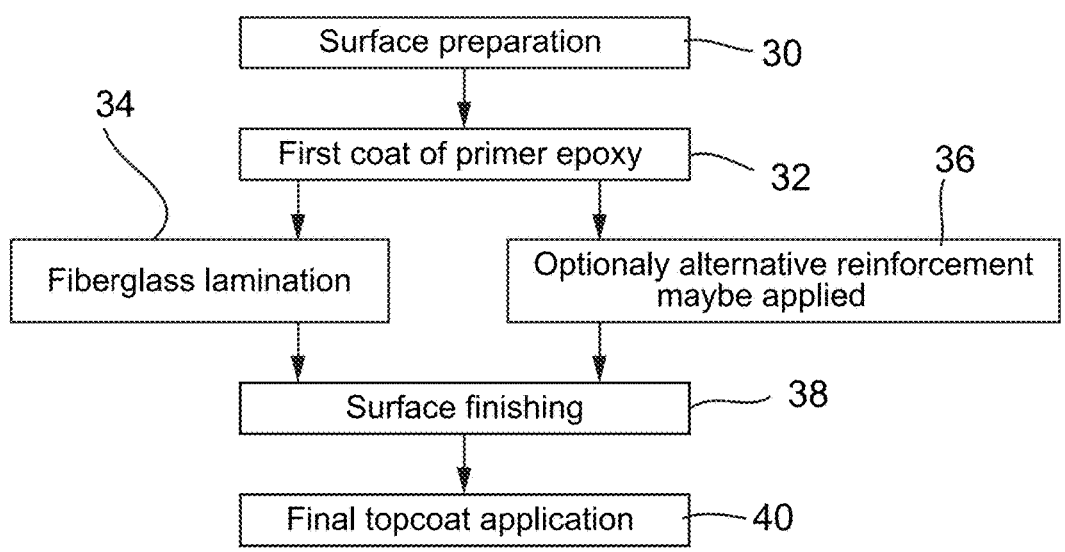
FIG. 4 is a schematic flow diagram of a manufacturing process that may be used to obtain the anti-crack system shown in FIGS. 2 and 3.

One exemplary procedure by which the system 10 may be fabricated is depicted in accompanying FIG. 4. As shown, surface of the panels 14*a*, 14*b* (typically formed of an aerospace grade of aluminum but could also be formed of a cured fiber-reinforced composite material) may be prepared, e.g., by suitable abrasion, chemical etching and rinsing in step 30. Once the bare structural surface of the panels 14*a*, 14*b* has been prepared, the initial primer coat 20 is applied in step 32. The fibrous tape 34 is then applied in the lengthwise direction L of the joint space between the panels 14*a*, 14*b* as previously described. Usually a single layer of fibrous tape 34 may be sufficient. However alternative materials, such as auto-adhesive polyvinyl tape may be applied according to step 36. The one or more layers of fibrous tape 34 are allowed to cure in place (e.g., via ambient temperature air curing, UV light curing or heat curing depending on the particular type of polymeric matrix material in which the fibers are embedded). Once the fibrous tape 24 has cured, the surface may thereafter be prepared in step 38 for the topcoat finish application which is then applied in step 40.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A method to prevent crack formation along a lengthwise extent of a joint space between painted exterior surfaces of adjacent metal structural panels of an aerospace component, wherein the method comprises:
    (a) providing adjacent metal structural panels of an aerospace component which abut one another along opposed non-recessed edges so as to define a non-recessed joint space therebetween, wherein the adjacent metal structural panels are connected to one another at interior surfaces thereof by a splice plate and a series of fasteners connecting the metal structural panels to the splice plate and spaced-apart relative to the joint space so as to define a region therebetween which includes the joint space, wherein the splice plate extends along the lengthwise extent of the joint space to close the joint space at the interior surfaces;
    (b) filing the joint space with a joint sealant;
    (c) applying a primer coating onto at least a portion of the exterior surfaces of the adjacent metal structural panels so as to cover the sealant filling the joint space and the portion of the exterior surfaces of the adjacent metal structural panels adjacent to the joint space;
    (d) applying a fibrous tape comprised of synthetic fibers embedded in a curable polymeric matrix onto the applied primer coating on the exterior surfaces of the adjacent metal structural panels adjacent to the joint space within the region defined between the series of fasteners so that the fibrous tape covers the sealant filling the joint space between the adjacent structural panels and is positioned over adjacent regions of the exterior surfaces of the structural panels but does not cover the series of fasteners;
    (e) allowing the polymeric matrix to cure;
    (f) applying a secondary primer overcoat onto at least the fibrous tape such that the secondary primer coating extends over and beyond lateral edges of the fibrous tape to thereby cover the fibrous tape; and thereafter
    (g) applying a paint topcoat layer over the secondary primer coating covering the fibrous tape and the exterior surfaces of the adjacent structural panels.

2. The method as in claim 1, wherein step (d) is practiced by orienting the synthetic fibers in the fibrous tape at an angle of about 45° relative to the lengthwise extent of the joint space.

3. The method as in claim 1, wherein the fiber composite material comprises synthetic fibers embedded in a polymeric adhesive matrix.

4. The method as in claim 3, wherein the synthetic fibers are selected from the group consisting of glass fibers, carbon fibers, boron fibers, aramid fibers and mixtures thereof.

5. The method component as in claim 4, wherein the polymeric adhesive matrix comprises an epoxy resin.

6. The method as in claim 5, wherein step (d) includes orienting the synthetic fibers in the fibrous tape at an angle of about 45° relative to the lengthwise extent of the joint space between the adjacent panels.

\* \* \* \* \*